United States Patent
Walker et al.

(10) Patent No.: US 10,489,836 B2
(45) Date of Patent: Nov. 26, 2019

(54) SYSTEMS AND METHODS WHEREIN A BUYER PURCHASES PRODUCTS IN A PLURALITY OF PRODUCT CATEGORIES

(71) Applicant: Facebook, Inc., Menlo Park, CA (US)

(72) Inventors: Jay S. Walker, Ridgefield, CT (US); Magdalena Mik Fincham, Greenwich, CT (US); John M. Packes, Jr., Hawthorne, NY (US); Russell Pratt Sammon, Stamford, CT (US); Michiko Kobayashi, Stamford, CT (US)

(73) Assignee: Facebook, Inc., Menlo Park, CA (US)

( * ) Notice: Subject to any disclaimer, the term of this patent is extended or adjusted under 35 U.S.C. 154(b) by 1421 days.

(21) Appl. No.: 14/022,594

(22) Filed: Sep. 10, 2013

(65) Prior Publication Data
US 2014/0012698 A1    Jan. 9, 2014

Related U.S. Application Data

(60) Division of application No. 11/535,322, filed on Sep. 26, 2006, now Pat. No. 8,560,395, which is a
(Continued)

(51) Int. Cl.
| G06Q 30/06 | (2012.01) |
| G06Q 10/02 | (2012.01) |
| G06Q 20/20 | (2012.01) |
| G06Q 30/02 | (2012.01) |
| G06Q 40/04 | (2012.01) |

(52) U.S. Cl.
CPC ......... *G06Q 30/0611* (2013.01); *G06Q 10/02* (2013.01); *G06Q 20/20* (2013.01); *G06Q 30/0234* (2013.01); *G06Q 30/0241* (2013.01); *G06Q 30/06* (2013.01); *G06Q 30/0613* (2013.01); *G06Q 30/0617* (2013.01); *G06Q 30/0633* (2013.01); *G06Q 30/0643* (2013.01); *G06Q 40/04* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS 5,999,914 A * 12/1999 Blinn ..................... G06Q 30/02
                                                        705/14.1
7,966,259 B1 *  6/2011 Bui ......................... G06Q 20/02
                                                        705/50

OTHER PUBLICATIONS

How to Define your Product Category (And Why It Might Be Harder Than You Think) Sally Martin, Jan. 21, 2013, available at: https://www.cpgdatainsights.com/get-started-with-nielsen-iri/how-to-define-your-product-category-and-why-it-might-be-harder-than-you-think (Year: 2013).*

* cited by examiner

*Primary Examiner* — Ming Shui
(74) *Attorney, Agent, or Firm* — Baker Botts L.L.P.

(57) ABSTRACT

Systems and methods are provided wherein an indication of a plurality of product categories is received, each product category being associated with a plurality of products. For example, the indication of the plurality of product categories may be received from a buyer. Buyer offer information, including an indication of an offer amount associated with the plurality of product categories, is also received. A subset of the plurality of products is selected for each of the product categories, and an indication of the selected products is provided. The buyer's offer may then be evaluated. If the buyer's offer is accepted, the selected products may be provided to the buyer in exchange for payment of the offer amount.

18 Claims, 13 Drawing Sheets

| 900 | SHOPPING LIST 902 | FIRST POTENTIAL PRODUCT LIST 904 | SECOND POTENTIAL PRODUCT LIST 906 | THIRD POTENTIAL PRODUCT LIST 908 | FOURTH POTENTIAL PRODUCT LIST 910 |
|---|---|---|---|---|---|
| | PC-092-1234 | P-0984-90234-02 RAGU® PASTA SAUCE | P-0283-17234-23 PREGO® PASTA SAUCE | P-0984-90234-02 RAGU® PASTA SAUCE | P-8902-29038-76 CLASSICO® SAUCE |
| | PC-903-9034 | P-0928-09823-68 STARKIST® TUNA FISH | P-0928-09823-68 STARKIST® TUNA FISH | P-2349-34583-04 BUMBLE-BEE® | P-2349-34583-04 BUMBLE-BEE® |
| | PC-709-8030 | P-2450-20344-32 WISE® POTATO CHIPS | P-2450-20344-32 WISE® POTATO CHIPS | P-2450-20344-32 WISE® POTATO CHIPS | P-2450-20344-32 WISE® POTATO CHIPS |
| | PC-634-9078 | P-9052-39242-31 COCA-COLA® | P-9052-39242-31 COCA-COLA® | P-9052-39242-31 COCA-COLA® | P-9052-39242-31 COCA-COLA® |
| | PC-123-9234 | P-5485-23048-24 IVORY® SOAP | P-5485-23048-24 IVORY® SOAP | P-5485-23048-24 IVORY® SOAP | P-5485-23048-24 IVORY® SOAP |

| | | | | |
|---|---|---|---|---|
| TOTAL SUBSIDY PAYMENTS 914 | $8.00 | $6.00 | $7.50 | $8.50 |
| TOTAL COSTS 916 | $14.50 | $15.00 | $15.50 | $17.00 |
| BREAK-EVEN PRICE 918 | $6.50 | $9.00 | $8.00 | $8.50 |
| NET PROFIT OR LOSS 920 | $2.50 | $0 | $1.00 | $0.50 |

Related U.S. Application Data continuation of application No. 09/609,598, filed on Jun. 29, 2000, now Pat. No. 7,188,080.

(60) Provisional application No. 60/203,550, filed on May 12, 2000.

| PRODUCT CATEGORY IDENTIFIER 302 | PRODUCT CATEGORY DESCRIPTION 304 | PRODUCTS IN CATEGORY 306 |
|---|---|---|
| PC-123-9234 | BATH SOAP (3 BARS) | P-0892-08924-97; P-5485-23048-24; P-9023-98574-54 |
| PC-092-1234 | PASTA SAUCE (16 OZ JAR) | P-0984-90234-02; P-0283-17234-23; P-1230-89127-12; P-8902-29038-76 |
| PC-634-9078 | SODA POP (6 CANS) | P-9052-39242931; P-7645-23424-26; P-2345-35345-57 |
| PC-574-8540 | 13 GALLON TRASH BAGS (PACK OF 20) | P-0982-29038-62; P-2341-12342-78 |
| PC-903-9034 | TUNA FISH (6 OZ CAN) | P-9823-98435-57; P-0928-09823-58; P-2349-34583-04 |
| PC-716-3590 | DRY CLEANING (1 SHIRT) | P-4216-80113-79 |
| PC-345-2501 | HOUSE PAINTING (1 10'X12' ROOM) | P-0713-29896-46 |
| PC-123-3213 | OIL CHANGE (1 CAR) | P-1492-12010-71; P-1492-12010-72 |
| PC-709-8030 | POTATO CHIPS (20 OZ BAG) | P-2450-20344-32; P-1519-72193-02; P-1967-10706-33 |

| PRODUCT IDENTIFIER 402 | PRODUCT DESCRIPTION 404 | BRAND 406 |
|---|---|---|
| P-0984-90234-02 | PASTA SAUCE (16 OZ JAR) | RAGU® |
| P-0283-17234-23 | PASTA SAUCE (16 OZ JAR) | PREGO® |
| P-1230-89127-12 | PASTA SAUCE (16 OZ JAR) | FIVE BROTHERS® |
| P-8902-29038-76 | PASTA SAUCE (16 OZ JAR) | CLASSICO® |
| P-0928-09823-58 | TUNA FISH (6 OZ CAN) | STARKIST® |
| P-2349-34583-04 | TUNA FISH (6 OZ CAN) | BUMBLE-BEE® |
| P-9823-98435-57 | TUNA FISH (6 OZ CAN) | CHICKEN OF THE SEA® |
| P-4216-80113-79 | DRY CLEANING (1 SHIRT) | SAM'S DRY CLEANING® |
| P-0713-29896-46 | HOUSE PAINTING (1 10'X12' ROOM) | TWO BROTHERS PAINTING® |
| P-1492-12010-71 | OIL CHANGE (1 CAR) | RUSTY'S GARAGE® |
| P-2450-20344-32 | POTATO CHIPS (20 OZ BAG) | WISE® |
| P-9052-39242-31 | SODA POP (6 CANS) | COCA-COLA® |
| P-5485-23048-24 | BATH SOAP (3 BARS) | IVORY® |

FIG. 4

| SUBSIDY IDENTIFIER 502 | SUBSIDY PROVIDER 504 | SUBSIDY AMOUNT 506 | SUBSIDY RULE 508 |
|---|---|---|---|
| S-1-092384 | RAGU® | $2 | FOR EACH JAR OF RAGU® PASTA SAUCE THAT A BUYER PURCHASES |
| S-2-092384 | STARKIST® | $1 | FOR EACH CAN OF STARKIST® TUNA FISH THAT A BUYER PURCHASES |
| S-3-092384 | BUMBLE-BEE® | $10,000 | 80% OF ALL CANS OF TUNA FISH SOLD THROUGH THE CONTROLLER WILL BE BUMBLE-BEE® TUNA FISH |
| S-4-092384 | CONTROLLER | $20 | FOR EACH NEW BUYER, DISTRIBUTED AS NECESSARY OVER THE BUYER'S FIRST FIVE VISITS |
| S-5-092384 | TOSTITOS® | $3 | FOR EACH PRODUCT LIST THAT INCLUDES BOTH TOSTITOS CHIPS® AND TOSTITOS SALSA® |
| S-6-092384 | COCA-COLA® | $3 | SHOPPING LIST INCLUDES "COCA-COLA® OR PEPSI®" AND THE BUYER PURCHASES COCA-COLA® |
| S-7-092384 | GENERAL MILLS® | $15,000 | DISTRIBUTED AS NECESSARY TOWARDS PURCHASES OF GENERAL MILLS® PRODUCTS, WITH A MAX OF $5 PER LIST |
| S-8-092384 | CITIBANK® | $30 | FOR EACH BUYER WHO AGREES TO SIGN UP FOR A CITIBANK® CREDIT CARD |
| S-9-092384 | GOOD HOUSEKEEPING® | $5 | FOR EACH BUYER WHO SIGNS UP FOR A FREE TRIAL SUBSCRIPTION TO GOOD HOUSEKEEPING MAGAZINE® |

| BUYER IDENTIFIER 702 | B-12-12-123434 |
|---|---|
| OFFER PRICE 704 | $9.00 |

| SHOPPING LIST 706 ||
|---|---|
| PC-092-1234 | PASTA SAUCE |
| PC-903-9034 | TUNA FISH |
| PC-709-8030 | POTATO CHIPS |
| PC-634-9078 | SODA POP |
| PC-123-9234 | BATH SOAP |

FIG. 7

| PRODUCT CATEGORY IDENTIFIER 802 | FIRST POTENTIAL PRODUCT 804 | SUBSIDY PAYMENTS PER PRODUCT 806 | COST PER PRODUCT 808 | BREAK-EVEN PRICE PER PRODUCT 810 |
|---|---|---|---|---|
| PC-092-1234 | P-0984-90234-02 RAGU® PASTA SAUCE | $2.00 | $3.50 | $1.50 |
| PC-903-9034 | P-0928-09823-58 STARKIST® TUNA FISH | $1.00 | $2.00 | $1.00 |
| PC-709-8030 | P-2450-20344-32 WISE® POTATO CHIPS | NONE | $2.50 | $2.50 |
| PC-634-9078 | P-9052-39242-31 COCA-COLA® | NONE | $1.50 | $1.50 |
| PC-123-9234 | P-5485-23048-24 IVORY® SOAP | NONE | $3.00 | $3.00 |

|  | SUBSIDY PAYMENTS 814 | COSTS 816 |
|---|---|---|
| PER PRODUCT TOTALS 818 | $3.00 | $12.50 |
| OTHER 820 | $5.00 | $2.00 |
| TOTAL FOR FIRST POTENTIAL PRODUCT LIST 822 | $8.00 | $14.50 |

| BREAK-EVEN PRICE FOR FIRST POTENTIAL PRODUCT LIST 826 | $6.50 |
|---|---|
| NET PROFIT OR LOSS 828 | $2.50 |

FIG. 8

SYSTEMS AND METHODS WHEREIN A BUYER PURCHASES PRODUCTS IN A PLURALITY OF PRODUCT CATEGORIES

CROSS REFERENCE TO RELATED APPLICATIONS

The present application is a divisional application under 35 U.S.C. § 121 of U.S. patent application Ser. No. 11/535,322, filed 26 Sep. 2006 and titled "Systems And Methods Wherein A Buyer Purchases Products In a Plurality of Product Categories," which is a continuation application of U.S. patent application Ser. No. 09/609,598, filed 29 Jun. 2000 and titled "Systems And Methods Wherein A Buyer Purchases Products In a Plurality of Product Categories," which claims the benefit of U.S. Provisional Patent Application No. 60/203,550 filed May 12, 2000. Each of the above-referenced applications is hereby incorporated by reference herein.

The present application is related to: U.S. patent application Ser. No. 09/348,566 entitled "Settlement Systems and Methods Wherein a Buyer Takes Possession at a Retailer of a Product Purchased Using a Communication Network" and filed Jul. 7, 1999, which is a continuation-in-part of U.S. patent application Ser. No. 09/337,906 entitled "Purchasing Systems and Methods Wherein a Buyer Takes Possession at a Retailer of a Product Purchased Using a Communication Network" and filed Jun. 22, 1999, which is a continuation-in-part of U.S. patent application Ser. No. 08/889,503 entitled "System and Process for Local Acquisition of Products Priced Online" and filed Jul. 8, 1997; U.S. patent application Ser. No. 09/219,267 entitled "Method and Apparatus for Facilitating Electronic Commerce Through Providing Cross-Benefits During a Transaction" and filed Dec. 23, 1998; U.S. patent application Ser. No. 09/282,747 entitled "Method and Apparatus for Providing Cross-Benefits Based on a Customer Activity" and filed Mar. 31, 1999; U.S. patent application Ser. No. 09/274,281 entitled "Method and Apparatus for Providing Cross-Benefits via a Central Authority" and filed Mar. 22, 1999; U.S. patent application Ser. No. 09/322,351 entitled "Method and Apparatus for Providing Cross Benefits and Penalties" and filed May 28, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers" filed on Sep. 4, 1996 and issued as U.S. Pat. No. 5,794,207 on Aug. 11, 1998. The entire contents of these application are incorporated herein by reference.

FIELD

The present invention relates to commerce. In particular, the present invention relates to systems and methods wherein a buyer purchases products in a plurality of product categories.

BACKGROUND

Typically, a buyer visits one or more retail stores to shop for a product. When the buyer finds the product he or she is looking for, at a reasonable price, the buyer purchases the product from the retail store. This traditional method, however, may require that the buyer visit a number of retail stores to determine a reasonable price for the product. Moreover, a retail store must attract buyers, such as by spending money on advertising. For example, when a new retail store opens for business, many buyers will not know what types of products are sold by the retail store. In addition, the traditional method does not let a party other than the retail store, such as a product manufacturer, establish a pricing relationship directly with a buyer. For example, a manufacturer may sell a product to a retail store (perhaps through a distributor) who ultimately determines the price at which the product is sold to a buyer.

Recently, products have been sold to buyers via communication networks such as the Internet (e.g., via an online Web merchant). Internet sales have been growing steadily over the past few years, and are expected to increase, because buyers are attracted to the ease and convenience of shopping online. For example, a buyer can shop online from the comfort of home and receive information from a number of Web merchants to determine a reasonable price for a product.

The sale of products from Web merchants to buyers, however, has a number of disadvantages. For example, in a typical sale via the Internet, traditional retail stores (e.g., retail stores which are not online) are typically left completely out of the transaction. In addition to losing a potential profit from the sale of the product itself, such retail stores lose the chance to sell additional products to the buyer, such as product accessories (e.g., batteries). Moreover, retail stores cannot sell unrelated products that attract the buyer's attention while he or she is in the store. This may still be a problem even if a retail store has invested the time and money required to establish an online service. Moreover, a retail store's online service may simply shift sales that would have otherwise occurred at the actual store (as opposed to attracting new buyers).

Known methods of selling products also do not account for a buyer who may be interested in purchasing a certain type of product without being concerned about the particular product he or she receives. For example, a buyer may be interested in purchasing a color television with a 32 inch screen. The buyer, however, may not be concerned about the particular model number or brand of television he or she purchases (e.g., which manufacturer produced the television). In this case, SONY® may be willing to subsidize the buyer's purchase to encourage the buyer to receive a SONY® television. Such a subsidy may, for example, gain a new customer for a manufacturer. Note that if the buyer was only interested in purchasing a SONY® television, SONY® may not have been willing to subsidize his or her purchase (e.g., because the buyer would have still bought a SONY® television without the subsidy).

U.S. patent application Ser. No. 09/337,906 filed Jun. 22, 1999 and entitled "Purchasing Systems and Methods Wherein a Buyer Takes Possession at a Retailer of a Product Purchased Using a Communication Network" solves many of the problems described above. In one disclosed embodiment, a purchasing system evaluates a buyer offer, including an offer price and a product category. If the buyer offer is acceptable, the purchasing system selects a particular product within the product category and arranges for a buyer to take possession of the product from a merchant. The buyer provides a payment to the purchasing system in exchange for the right to take possession of the product from the merchant. Such an embodiment may enable a buyer to receive a product more quickly as compared to having the product delivered to his or her home. According to one embodiment, a subsidy from a third party (e.g., a product manufacturer) may be applied to a buyer's purchase of the product.

In many of the methods described above, however, a buyer may not be able to take advantage of a subsidy across transactions and/or across product categories. For example, consider a subsidy that enables a buyer to purchase a first product at a reduced price. In a separate transaction, however, no subsidy is available and the buyer is not able to purchase a second product at a reduced price. That may be the case even if the amount of the subsidy was large enough to have allowed both products to be profitably sold to the buyer at reduced prices.

Another disadvantage is that it may be inconvenient for a buyer to provide information associated with a large number of products he or she wants to purchase. For example, a buyer may purchase a large number of grocery items each month, and it may be time consuming for the buyer to indicate all of these grocery items every month. This may be particularly true if, for example, the buyer supplies additional information about each grocery item. For example, it may be especially inconvenient for a buyer to indicate a grocery item category, a list of particular grocery item brands, and an offer price for each of a large number of grocery items.

A need exists, therefore, for further systems and methods that may be used when a buyer purchases products in a plurality of product categories.

SUMMARY

To alleviate these and other problems, the present invention introduces systems and methods wherein a buyer purchases products in a plurality of product categories.

According to one embodiment of the present invention, an indication of a plurality of product categories is received, each product category being associated with a plurality of products. Buyer offer information, including an indication of an offer amount associated with the plurality of product categories, is also received. A subset of the plurality of products is selected for each of the product categories, and an indication of the selected products is provided.

According to another embodiment, a payment identifier is received from a buyer. An indication of a first product category, associated with a first set of products, and a second product category, associated with a second set of products, is also received from the buyer. A binding buyer offer, including an indication of an offer amount associated with the first set of products and the second set of products, is also received. A first product is selected from the first set of products, and a second product is selected from the second set of products, at least one of the first product and the second product being selected based on an associated subsidy. The buyer offer is evaluated based on the offer amount. If the buyer offer is accepted, it is arranged for the buyer to provide payment of an amount based on the offer amount using the payment identifier, an indication of the first product and the second product is provided to the buyer, and information is transmitted enabling the buyer to take possession of the first product and the second product at a merchant.

According to another embodiment, an indication of a plurality of product categories is received, each product category being associated with a plurality of products. Buyer offer information is also received, including an indication of an offer amount associated with the plurality of product categories. A subset of the plurality of products for each of the product categories is selected, and the buyer offer information is evaluated based on the offer amount.

According to another embodiment, an indication of a plurality of product categories is received, each product category being associated with a plurality of products. A subset of the plurality of products is selected for each of the product categories, and offer information is provided, including an indication of an offer amount associated with the plurality of product categories. An indication of the selected products may then be provided.

According to another embodiment, an indication of a plurality of product categories is provided, each product category being associated with a plurality of products. Buyer offer information is also provided, including an indication of an offer amount associated with the plurality of product categories. An indication of selected products may then be received.

One embodiment of the present invention comprises: means for receiving an indication of a plurality of product categories, each product category being associated with a plurality of products; means for receiving buyer offer information, including an indication of an offer amount associated with the plurality of product categories; means for selecting a subset of the plurality of products for each of the product categories; and means for providing an indication of the selected products.

Another embodiment comprises: means for receiving from a buyer a payment identifier; means for receiving from the buyer an indication of a first product category associated with a first set of products; means for receiving from the buyer an indication of a second product category associated with a second set of products; means for receiving from the buyer a binding buyer offer, including an indication of an offer amount associated with the first set of products and the second set of products; means for selecting a first product from the first set of products; means for selecting a second product from the second set of products, wherein at least one of the first product and the second product are selected based on an associated subsidy; means for evaluating the buyer offer based on the offer amount; means for arranging for the buyer to provide payment of an amount based on the offer amount using the payment identifier; means for providing to the buyer an indication of the first product and the second product; and means for transmitting information enabling the buyer to take possession of the first product and the second product at a merchant.

Another embodiment comprises: means for receiving an indication of a plurality of product categories, each product category being associated with a plurality of products; means for receiving buyer offer information, including an indication of an offer amount associated with the plurality of product categories; means for selecting a subset of the plurality of products for each of the product categories; and means for evaluating the buyer offer information based on the offer amount.

Another embodiment comprises: means for receiving an indication of a plurality of product categories, each product category being associated with a plurality of products; means for selecting a subset of the plurality of products for each of the product categories; means for providing offer information, including an indication of an offer amount associated with the plurality of product categories; and means for providing an indication of the selected products.

Another embodiment comprises: means for providing an indication of a plurality of product categories, each product category being associated with a plurality of products; means for providing buyer offer information, including an indication of an offer amount associated with the plurality of product categories; and means for receiving an indication of selected products.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIG. 3 is a tabular representation of a portion of a product category database according to an embodiment of the present invention.

FIG. 4 is a tabular representation of a portion of a product database according to an embodiment of the present invention.

FIG. 5 is a tabular representation of a portion of a subsidy database according to an embodiment of the present invention.

FIG. 7 is a tabular representation of a record of a shopping list database according to an embodiment of the present invention.

FIG. 8 is a tabular representation of a record of a product list calculation database according to an embodiment of the present invention.

DETAILED DESCRIPTION

The present invention is directed to systems and methods wherein a buyer purchases products in a plurality of product categories. As used herein, the term "product" refers to anything that may be purchased by a buyer (e.g., a good, a service, or any interest in a good or a service). Examples of a product include a grocery item, a book, a consumer electronics device, an oil change for an automobile, a software program or information file (e.g., an MP3 audio file), and a movie or airline ticket. The phrase "product category" refers to any set that includes one or more particular products. By way of example, a product category of "Travel Books—Mexico City" may include three different travel books about Mexico City, each written by a different author. A product category may be narrow (e.g., "pretzel sticks") or broad (e.g., "snack foods").

Figure 1A:
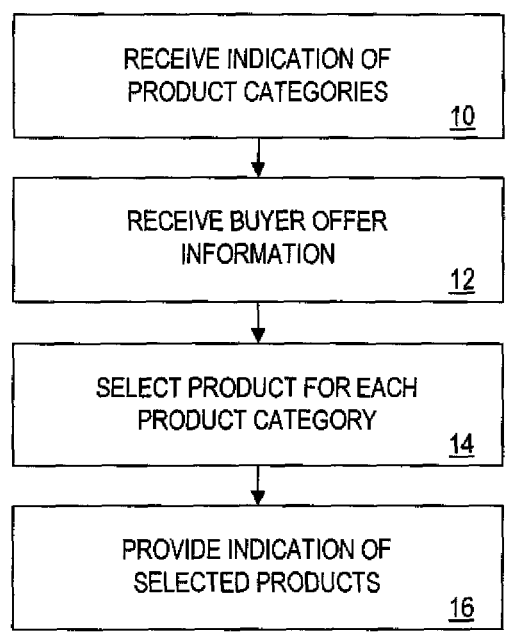
FIG. 1A is a flow chart of a method according to an embodiment of the present invention.

Turning now in detail to the drawings, FIG. 1A is a flow chart of a method according to an embodiment of the present invention. At 10, an indication of a number of product categories is received. For example, an indication of "pasta sauce (16 ounce jar)" and "tuna fish (6 ounce can)" may be received from a buyer via a communication network. In this case, the product category of "pasta sauce (16 ounce jar)" may be associated with, for example, RAGUS, PREGO®, FIVE BROTHERS®, and CLASSICO® brands of pasta sauce. According to another embodiment, an indication of a product category may instead comprise an actual list of particular products.

The indication of the number of product categories (e.g., pasta sauce and tuna fish) may be thought of as the buyer's "shopping list" indicating the types of products he or she is interested in purchasing.

According to one embodiment, a shopping list may be stored for a buyer for use in a number of different transactions. For example, a buyer may register with a transaction system and provide a shopping list indicating the product categories he or she typically purchases every month. The transaction system may store the shopping list in a database, and retrieve the information whenever the buyer accesses the transaction system. In this case, the buyer may modify the retrieved shopping list as appropriate (e.g., by adding and/or deleting product categories).

According to another embodiment, the transaction system may suggest modifications to the shopping list. For example, the transaction system may track the buyer's purchases and determine that he or she purchases a one pound bag of sugar once every three months. The transaction system may then add a "one pound bag of sugar" product category to the buyer's shopping list (if it was not already included on his or her list) or arrange for the product category to only be included every third month.

At 12, buyer offer information, including an indication of an offer amount associated with the plurality of product categories, is received. For example, a buyer may indicate that he or she is willing to pay $50.00 to receive products from each product category included on his or her shopping list. Note that, as used herein, the term "offer" is not limited to the legal definition of an offer (e.g., a contract may not be formed if the offer is accepted). That is, the controller 200 may simply display a list of selected products to a buyer based on a shopping list and ask the buyer if he or she would like to complete the transaction. According to another embodiment, however, the buyer offer information comprises a binding offer. That is, the buyer will be obligated to purchase his or her products if the transaction system accepts the offer (e.g., his or her credit card may be charged even before the selected products are displayed to the buyer).

According to one embodiment, the offer amount is defined by the buyer. In this case, the buyer determines how much he or she is willing to pay to receive products from each product category. The buyer may also select an offer amount from a list of suggested offer amounts generated by the transaction system. According to another embodiment, the transaction system calculates an offer amount which may then be accepted by the buyer.

The buyer may provide a single offer amount with respect to all of the product categories. According to another embodiment, the buyer instead provides a separate offer amount with respect to each product category. In this case, the transaction system may calculate a total offer amount by adding up each of the separate offer amounts provided by the buyer.

At 14, a subset of the plurality of products for each of the product categories is selected by the transaction system. That is, the transaction system may select one or more of the products associated with each product category. For example, the transaction system may select PREGO® brand pasta sauce for the "pasta sauce (16 ounce jar)" product category indicated by the buyer.

A product may be selected, for example, based on (i.e., based at least in part on) a transaction history associated with the buyer, an address associated with the buyer, demographic information associated with the buyer, psychographic information associated with the buyer (e.g., information about the buyer's opinions and values), a credit rating associated with the buyer, and/or another offer associated with the buyer. By way of example, the transaction system may select one product for buyers who live in New York and another product for buyers who live in California.

The transaction system may also select a product based on the buyer's offer amount. For example, a buyer who offers to pay a high price for a television may receive a television produced by a well-known manufacturer, while a buyer who offers to pay a lower price may receive a television produced by a lesser-known manufacturer.

According to one embodiment of the present invention, the transaction system selects a product based on one or more subsidies. As used herein, a "subsidy" refers to any benefit that may be applied to a transaction. For example, a manufacturer may offer to provide a subsidy each time a particular product is selected by the transaction system. A manufacturer may also, for example, offer to provide a payment when a predetermined number of products have been sold via the transaction system, or when a product has been selected for a predetermined percentage of buyers. According to another embodiment, a merchant (e.g., a retail store), the controller, and/or a another party may provide a subsidy. As will be described, the transaction system may track various subsidies, such as to increase an amount of profit associated with one or more transactions.

A subsidy may be provided, for example, based on a product identifier, a product category, a product manufacturer, a product brand, a product description, a product quantity (e.g., a subsidy may be provided when the buyer purchases a predetermined number of products in a product category), a product class (e.g., a higher or lower quality product), at least one product feature (e.g., a subsidy may be provided when a buyer purchases a television with picture-in-picture capability), an accessory associated with the product, an age associated with the product, a product condition, a product preference (e.g., the buyer prefers that a video camera use VHS-C type video tapes), an offer period (e.g., a buyer offer period or a subsidy offer period), a product cost, a product retail price, the offer amount, delivery information, and/or payment information.

At 16, an indication of the selected products is provided. For example, the transaction system may display a list of selected products to a buyer via a Web site. According to another embodiment, the indication of the selected products may be provided to a merchant. For example, the transaction system may transmit an electronic mail message to a retail store indicating the buyer's name and a list of selected products. In this case, the selected products may be gathered and provided to the buyer when he or she visits the retail store.

According to one embodiment, the transaction system evaluates the buyer's offer to determine if the offer will be accepted. For example, the transaction system may compare the buyer's offer amount with a total product cost associated with the list of selected products. The evaluation of the buyer's offer amount may also be based on one or more subsidies, such as those described above with respect to product selection.

If the buyer's offer is accepted, the transaction system may arrange for the buyer to provide payment of an amount based on the offer amount in exchange for the selected products. The transaction system may also transmit information enabling the buyer to take possession of the selected products at a merchant. For example, the transaction system may transmit a transaction code to the buyer. The buyer can then provide the transaction code to the merchant when he or she takes possession of the selected products. The transaction system may instead transmit information to the merchant (e.g., via a payment processing device) enabling the buyer to take possession of the selected products. According to another embodiment, the transaction system instead arranges for the selected products to be delivered to the buyer.

Transaction System

Figure 1B:
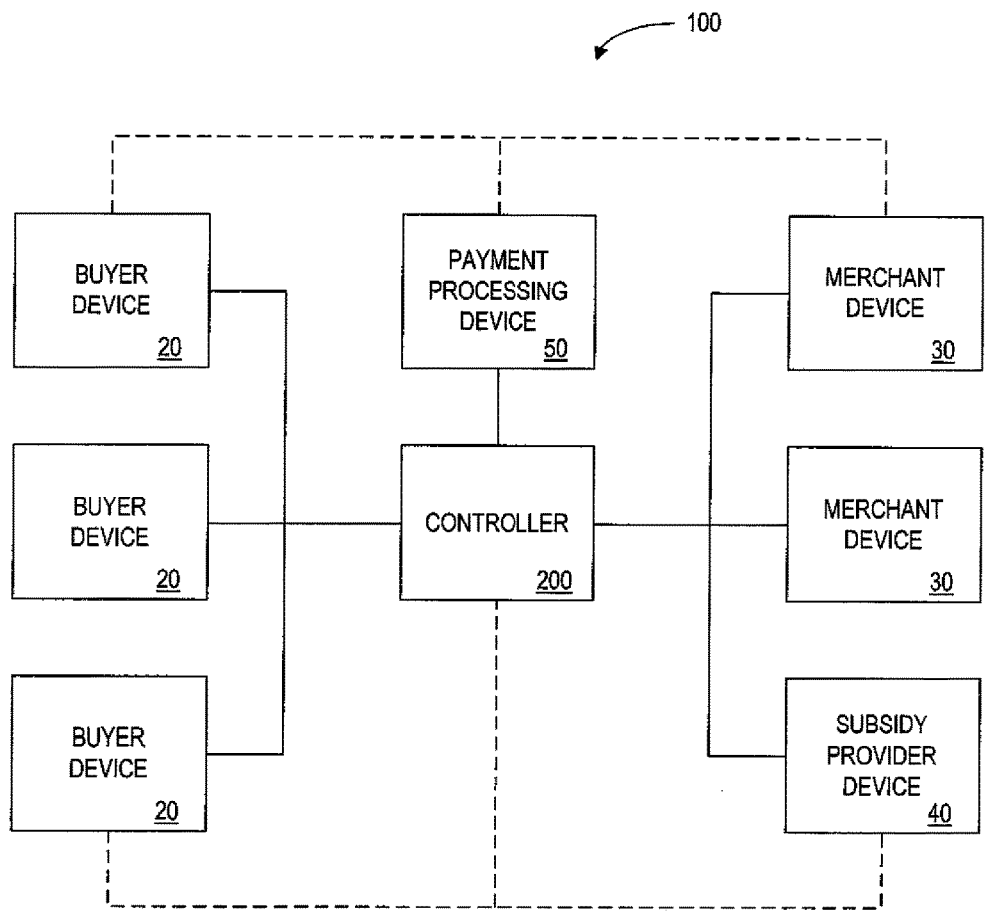
FIG. 1B is a block diagram overview of a transaction system according to an embodiment of the present invention.

FIG. 1B is a block diagram overview of a transaction system 100 according to one embodiment of the present invention. The transaction system 100 includes a controller 200 in communication with a number of buyer devices 20. As used herein, a device (including the controller 200, the buyer devices 20, merchant devices 30, a subsidy provider device 40, and/or a payment processing device 50) may communicate, for example, through a communication network such as a Local Area Network (LAN), a Wide Area Network (WAN), a Metropolitan Area Network (MAN), a Public Switched Telephone Network (PSTN), a proprietary network, a Wireless Access Protocol (WAP) network, or an Internet Protocol (IP) network such as the Internet, an intranet or an extranet. Moreover, as used herein, a communication network includes those enabled by wired or wireless technology.

In one embodiment of the present invention, the buyer devices 20 communicate with a remote Web-based controller 200 (e.g., a server) via the Internet. Although embodiments of the present invention will be described with respect to information exchanged using a Web site, according to other embodiments information can be exchanged using, for example, a wired or wireless telephone, an Interactive Voice Response Unit (IVRU), a facsimile machine, postal mail, electronic mail, a WEBTV® interface, a cable network interface, and/or a wireless device.

A buyer device 20 and/or a merchant device 30 may be, for example, a Personal Computer (PC), a portable computing device such as a Personal Digital Assistant (PDA), a wired or wireless telephone, a one-way or two-way pager, a kiosk, a Point of Sale (POS) terminal, a Credit Authorization Terminal (CAT) device, an Automated Teller Machine (ATM) device, a shopping cart device, a smart or magnetic stripe card, and/or any other appropriate communication or storage device. Note that these devices 20, 30 may include a number of different types of devices (e.g., some buyers may use PCs while others use telephones).

The controller 200 may be any device capable of performing the functions described herein. One embodiment of the controller 200 is described in detail with respect to FIG. 2. Note that any of the buyer device 20, the merchant device 30, and/or the controller 200 may be incorporated in a single device. For example, a kiosk located in a merchant's store may operate as both a buyer device 20 and a controller 200.

As will be explained, the transaction system 100 may be used to facilitate a transaction in which a buyer purchases products in a plurality of product categories. According to one embodiment of the present invention, the controller 200 receives a shopping list (e.g., a list of product categories). Note that the shopping list may include both particular brands of products and product categories (e.g., a buyer may accept any brand of toothpaste but only RAGU® pasta sauce).

The controller 200 may, for example, retrieve the shopping list from a database stored at the controller 200. According to another embodiment, the shopping list is stored at the buyer device 20, such as by storing the shopping list as a "cookie." A cookie is a block of data that a Web server (e.g., the controller 200) stores on a client system (e.g., the buyer device 20). When a buyer returns to the same Web site, or an associated Web site, the browser of the buyer device 20 sends a copy of the cookie back to the Web server. Cookies may be used to identify buyers associated with the buyer device 20, to instruct the Web server to send a customized version of a Web page, and for other purposes.

The controller 200 may also receive an indication of an offer amount associated with the shopping list. For example, a buyer may use a buyer device 20 to indicate that he or she is willing to pay no more than $50.00 to purchase products indicated by a shopping list.

According to an embodiment of the present invention, the controller 200 selects a particular brand of product for each product category on the buyer's shopping list and evaluates the buyer's offer. The controller 200 may, for example, communicate with merchant devices 30 to determine a minimum acceptable price associated with various products (e.g., based on current retail prices). The controller 200 may also communicate with a subsidy provider device 40 to determine which subsidies can be applied to the transaction. Note that these determinations may be performed prior to, or in response to, the buyer's offer.

If the buyer's offer is acceptable, the controller 200 may communicate with a payment processing device 50 to arrange for the buyer to provide payment of the offer amount. The controller 200 may also transmit a list of the selected brands to the buyer device 20. According to one embodiment, the controller 200 transmits this list to the buyer via the same communication network the buyer used to indicate his or her offer price. According to another embodiment, different communication networks are used for this purpose.

According to one embodiment, the buyer then takes possession of the selected products at a merchant (e.g., by visiting a local retail store). According to another embodiment, the selected products are instead delivered to the buyer's home.

In addition to communicating with the controller 200, a buyer device 20 may communicate directly with, for example, the merchant device 30 or the subsidy provider device 40 (shown by dashed lines in FIG. 1B). For example, a buyer may visit a Web site associated with a subsidy provider to earn subsidies or transmit a transaction code directly to a merchant's POS terminal.

EXAMPLES

Alice uses her PC to register with a Web site associated with the transaction system 100 by providing her name, address, and credit card number. Alice then transmits the following shopping list to the transaction system 100:
  1 jar of ground coffee (12 ounces);
  3 yogurt cups (8 ounces each);
  1 loaf of bread (20 ounces);
  1 bag dry dog food (4 pounds); and
  1 package of TRIDENT® chewing gum.

By transmitting this shopping list, Alice is indicating that she is willing to purchase any brand of coffee (e.g., FOLGERS®, MAXWELL HOUSE, or CHOCK FULL O'NUTS®), any brand of yogurt, any brand of bread, and any brand of dog food. She is also indicating that she will only purchase. TRIDENT® chewing gum. Alice also transmits an offer amount of $15.00 for her shopping list (i.e., the price that she will pay for products selected from each product category on her shopping list). Note that the offer amount determined by Alice may not be based on retail prices associated with the product categories in her shopping list. According to another embodiment, she may instead submit an offer amount based on the retail prices (e.g., by offering to pay 80% of the retail prices).

The transaction system 100 accepts Alice's offer and arranges for her to pay $15.00 using the credit card number she provided during registration. The transaction system 100 then transmits the following shopping list to Alice's PC:
  1 jar of MAXWELL HOUSE® ground coffee (12 ounces);
  2 DANNON® yogurt cups and 1 YOPLAIT® yogurt cup (8 ounces each);
  1 loaf of WONDER® bread (20 ounces);
  1 bag ALPO® dry dog food (4 pounds); and
  1 package of TRIDENT® chewing gum.
The transaction 100 system also transmits information enabling Alice to take possession of these items from a merchant.

In another example, Bob visits his local supermarket and accesses the transaction system 100 using his PDA. Because Bob had previously registered with the transaction system 100, he supplies a user name and password and indicates that he is interested in paying $5.00 to purchase the following items:
  1 jar of ground coffee (12 ounces); and
  3 yogurt cups (8 ounces each).
The transaction system 100 determines that FOLGERS® has agreed to pay $10,000.00 if FOLGERS® coffee is selected for 80% of the male buyers who purchase coffee via the transaction system 100 during the current month. Because FOLGERS® has been selected for only 75% of the male buyers so far this month, the transaction system 100 selects FOLGERS® coffee for Bob. Without this subsidy, MAXWELL HOUSE® coffee would have been selected because it would otherwise result in a higher profit for the transaction system 100.

The transaction system 100 also selects three DANNON® yogurt cups, accepts Bob's offer, and arranges for him to pay $5.00 via his credit card. The transaction system 100 transmits a transaction code to Bob's PDA and to a merchant device 30. Bob then provides the transaction code to the supermarket's POS terminal via his PDA. The POS terminal verifies the transaction code by communicating with the merchant device 30, and Bob is allowed to take the coffee and yogurt from the supermarket.

In another example, Carol calls a toll free telephone number and speaks with a telephone call center operator associated with the transaction system 100. She indicates that she is interested in purchasing products in the following categories for $300:
  a round trip plane ticket from New York to Boston (leaving during the morning of March 17th, coming back during the afternoon of March 18th);
  a one-night stay at any hotel in Boston (on the night of March 17th); and
  a two-day rental of any full-sized car (from March 17th to March 18th, inclusive).

In this case, Carol's offer to purchase the plane ticket, hotel room, and car rental is a binding offer which is secured by her credit card account. That is, she will be obligated to purchase products from these product categories if the transaction system 100 accepts her offer. A controller 200 communicates with at least one merchant device 30 (e.g., a rental car company server) to determine what products are available. In addition, the controller 200 communicates with at least one subsidy provider device 40 (e.g., an airline company server) to determine if any subsidies are available for her shopping list.

Based on this information, the transaction system 100 determines a product list for Carol as follows:
  a round trip ticket on US AIRWAYS®;
  a one-night stay at the HOTEL BUCKMINSTER®; and
  a two-day rental of a DODGE INTREPID® from AVIS®.
The transaction system indicates this product list to Carol and bills the offer price (i.e., $300) to her credit card account. In addition, the transaction system 100 arranges for USAIR®, the HOTEL BUCKMINSTER®, and AVIS® to receive payment for these products.

In another example, Dan submits an offer to purchase products from the following shopping list for an offer price of $12:
  2 cans baked beans; and
  3 boxes grain/fiber cereal.
In addition, Dan supplies a buyer identifier (e.g., his phone number) and a retailer where he would like to purchase these products (e.g., PATHMARK®). The transaction system 100 selects the following products:
  2 cans B&M® baked beans; and
  3 boxes GRAPE NUTS® cereal.
Dan purchases these products at a PATHMARK® store, and a merchant device 30 transmits information about the purchase (e.g., a list of product identifiers and a transaction total) to transaction system 100. Based on this information, transaction system 100 mails a rebate to Dan for a value equal to the difference between $12 and the transaction total indicated by the PATHMARK® merchant device 30.

In another example, Emily accesses a Web site associated with the transaction system 100 and offers to purchase the following shopping list for an offer price of $10:
  a book from the current bestseller list;
  a dance party CD featuring hip-hop music; and
  a map of the New York City area.
In addition, she submits a buyer identifier (e.g., her home address). The transaction system 100 selects the following products:
  The Brethren by John Grisham;
  MTV Hip-Hop 2000; and
  RAND MCNALLY'S® map of the New York City area.
The transaction system 100 displays this product list to Emily and prompts her to submit a credit card number to complete the purchase. She submits her credit card number, and the products are mailed to her home address.

Controller

Figure 2:
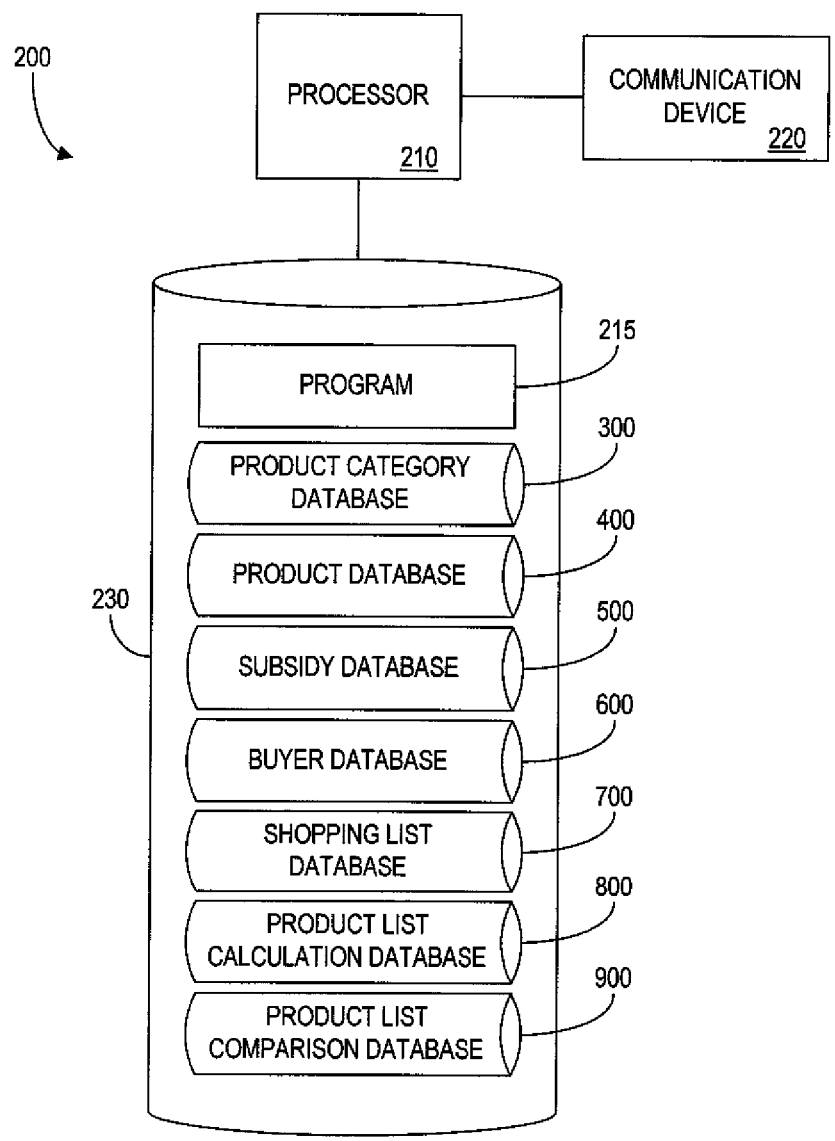
FIG. 2 is a block diagram of a controller according to an embodiment of the present invention.

FIG. 2 illustrates a controller 200 that is descriptive of the device shown in FIG. 1B according to one embodiment of the present invention. Note that the controller 200 may comprise a single computer, a network, or any other device capable of performing the functions described herein. The controller 200 comprises a processor 210, such as one or more INTEL® Pentium® processors, coupled to a communication device 220 configured to communicate through a communication network (not shown in FIG. 2). The communication device 220 may be used to communicate, for example, with one or more buyer devices 20, merchant devices 30, subsidy provider devices 40, and/or payment processing devices 50.

The processor 210 is also in communication with a storage device 230. The storage device 230 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may receive an indication of a plurality of product categories, each product category being associated with a plurality of products. The processor 210 may also receive buyer offer information, including an indication of an offer amount associated with the plurality of product categories. The processor 210 may select a subset of the plurality of products for each of the product categories, and provide an indication of the selected products.

According to another embodiment, the processor 210 receives a payment identifier from the buyer (e.g., via the communication device 220). The processor 210 also receives an indication of a first product category, associated with a first set of products, and a second product category, associated with a second set of products, from the buyer. The processor 210 receives a binding buyer offer, including an indication of an offer amount associated with the first set of products and the second set of products, from the buyer.

Based on at least one associated subsidy, the processor 210 selects a first product from the first set of products and a second product from the second set of products, and evaluates the buyer offer based on the offer amount.

If the buyer offer is acceptable, the processor 210 arranges for the buyer to provide payment of an amount based on the offer amount using the received payment identifier, and provides an indication of the first product and the second product to the buyer. The processor 210 also transmits information that enables the buyer to take possession of the first product and the second product at a merchant.

The program 215 may be stored in a compressed, uncompiled and/or encrypted format. The program 215 furthermore includes program elements that may be necessary, such as an operating system, a database management system, and "device drivers" used by the processor 210 to interface with peripheral devices. Appropriate program elements are known to those skilled in the art.

Note that the processor 210 and the storage device 230 may be, for example, located entirely within a single computer or other computing device or located in separate devices coupled through a communication channel. In one embodiment, the controller 200 comprises one or more computers that are connected to a remote database server.

As used herein, information may be "received" by or "transmitted" to, for example, (i) the controller 200 from a buyer device 20, a merchant device 30, a subsidy provider device 40, or a payment processing device 50, or (ii) a software application or module within the controller 200 from another software application, module or any other source.

Figure 9:
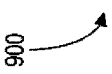
FIG. 9 is a tabular representation of a record of a product list comparison database according to an embodiment of the present invention.

As shown in FIG. 2, the storage device 230 also stores a product category database 300 (described with respect to FIG. 3), a product database 400 (described with respect to FIG. 4), a subsidy database 500 (described with respect to FIG. 5), a buyer database 600 (described with respect to FIG. 6), a shopping list database 700 (described with respect to FIG. 7), a product list calculation database 800 (described with respect to FIG. 8), and a product list comparison database 900 (described with respect to FIG. 9).

Examples of databases that may be used in connection with the transaction system 100 will now be described in detail with respect to FIGS. 3 through 9. Each figure depicts a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Product Category Database

Referring to FIG. 3, a table represents one embodiment of the product category database 300 that may be stored at the controller 200 shown in FIG. 1B according to an embodiment of the present invention. The table includes entries identifying product categories that may be indicated via the transaction system 100. The table also defines fields 302, 304, 306 for each of the entries. The fields specify a product category identifier 302, a product category description 304, and the product or products in the category 306.

The product category identifier 302 may be, for example, an alphanumeric code associated with a product category that may be indicated via the transaction system 100. The product category database 300 also stores the product category description 304 that describes the product or products that are associated with the product category identifier 302. The product category description 304 may be, for example, any text, image, and/or audio information that describes the product or products in the category.

For each product category, the product category database 300 also stores one or more identifiers associated with the products in the category 306. For example, as shown by the first entry in FIG. 3, the product category identifier 302 of "PC-123-9234" is associated with three products in the category 306 (e.g., three different identifiers associated with three different products). The products in the category 306 may be created and updated by an operator associated with the controller 200. According to another embodiment, information received from a manufacturer or a merchant (e.g., inventory information received from a merchant device 30), may be used to update the products in the category 306.

Product Database

Referring to FIG. 4, a table represents one embodiment of the product database 400 that may be stored at the controller 200 shown in FIG. 1B according to an embodiment of the present invention. The table includes entries identifying products that may be purchased via the transaction system 100. The table also defines fields 402, 404, 406 for each of the entries. The fields specify a product identifier 402, a product description 404, and a brand 406.

The product identifier 402 may be, for example, an alphanumeric code associated with a product that may be purchased via the transaction system 100. The product identifier 402 may be based on, or associated with, the products in the category 306 stored in the product category database 300.

The product database 400 also stores the product description 404 that describes the category of the product associated with the product identifier 402. The product description 404 may be, for example, any text, image, and/or audio information that describes the product and may be based on, or associated with, the product category description 304 stored in the product category database 300.

The product database 400 also stores a specific product brand 406 associated with each product. The brand 406 may indicate, for example, a manufacturer of the product associated with the product identifier 402. In the case of a service, the brand 406 may indicate a party that provides the service associated with the product identifier 402.

Subsidy Database

Referring to FIG. 5, a table represents one embodiment of the subsidy database 500 that may be stored at the controller 200 shown in FIG. 1B according to an embodiment of the present invention. The table includes entries identifying subsidies that may be applied via the transaction system 100. The table also defines fields 502, 504, 506, 508 for each of the entries. The fields specify a subsidy identifier 502, a subsidy provider 504, a subsidy amount 506, and a subsidy rule 508.

The subsidy identifier 502 may be, for example, an alphanumeric code associated with a subsidy that may be applied via the transaction system 100. For each subsidy, the subsidy database 500 also stores the subsidy provider 504 indicating the party who supplies the subsidy. Note that a subsidy may be provided, for example, by a manufacturer of a product (e.g., RAGU®). A subsidy may also be provided, for example, by the controller 200. For example, the controller 200 may provide a subsidy to buyers who have recently registered with the transaction system 100. The controller 200 may instead provide a subsidy to buyers who frequently use the transaction system 100. Also note that a subsidy may be provided by another party (e.g., CITIBANK®). For example, a third party may provide a subsidy if a buyer agrees to perform a task. Some examples of third party subsidies are described, for example, in U.S. patent application Ser. No. 09/219,267 entitled "Method and Apparatus for Facilitating Electronic Commerce Through Providing Cross-Benefits During a Transaction."

For each subsidy, the subsidy database 500 also stores the subsidy amount 506 indicating the benefit associated with the subsidy and a subsidy rule 508 indicating when the subsidy amount 506 is to be applied. For example, a subsidy may comprise a predetermined monetary amount to be applied to a single transaction. A subsidy may instead comprise a monetary amount to be applied as a result of a number of transactions. For example, the subsidy may comprise a predetermined monetary amount to be applied when one hundred product have been sold. The subsidy may instead be based on a formula that indicates a monetary amount based on a number of products that have been sold. According to one embodiment, a subsidy may be in the form of non-monetary consideration (e.g., advertising).

Buyer Database

Figure 6:
FIG. 6 is a tabular representation of a portion of a buyer database according to an embodiment of the present invention.

Referring to FIG. 6, a table represents one embodiment of the buyer database 600 that may be stored at the controller 200 shown in FIG. 1B according to an embodiment of the present invention. The table includes entries identifying buyers who may purchase products via the transaction system 100. The table also defines fields 602, 604 for each of the entries. The fields specify a buyer identifier 602 and a payment identifier 604.

The buyer identifier 602 may be, for example, an alphanumeric code associated with a buyer who may purchase products via the transaction system 100. The buyer identifier 602 may be, for example, generated by the controller 200 when a buyer registers to use the controller 200 or may be created by the buyer (e.g., when the buyer creates a user name and password). According to other embodiments, the buyer identifier 302 may comprise, for example, a name, a mailing address, an electronic mail address, a frequent shopper number, an IP address, and/or a wireless telephone number.

For each buyer, the buyer database 600 also stores the payment identifier 604 associated with the buyer. The payment identifier 604 may be, for example, a credit card number, a debit card number, a checking account number, or digital payment protocol information that can be used to receive payment from the buyer (e.g., to receive payment of an offer amount in exchange for products). The payment identifier 604 may be based on, for example, information received from the buyer device 20 when the buyer registers to use the controller 200 or when the buyer submits offer information. Note that in some cases, the payment identifier 604 may also serve as the buyer identifier 602.

Shopping List Database

Referring to FIG. 7, a table represents a record in the shopping list database 700 that may be stored at the controller 200 shown in FIG. 1B according to an embodiment of the present invention. The record represents a shopping list (e.g., a plurality of product categories) associated with a buyer. Each record defines fields 702, 704, 706 for each of the entries. The fields specify a buyer identifier 702, an offer price 704, and a shopping list 716.

The buyer identifier 702 may be, for example, an alphanumeric code associated with a buyer who may purchase products via the transaction system 100. The buyer identifier 702 may be based on, or associated with, the buyer identifier 602 stored in the buyer database 600. The offer price 704 indicates the amount the buyer is willing to pay in exchange for products in his or her shopping list 706. The shopping list 706 represents a series of product categories, and may be based on, or associated with, for example, the product category identifier 302 and the product category description 304 stored in the product category database 300. As shown by the record illustrated in FIG. 7, the buyer associated with buyer identifier 712 "B-12-12-123434" has offered to pay $9.00 to purchase products in five categories.

Product List Calculation Database

Referring to FIG. 8, a table represents one record of the product list calculation database 800 that may be stored at the controller 200 shown in FIG. 1B according to an embodiment of the present invention. Note that a number of such records may be stored in the product list calculation database 800, each record representing a different potential product list. Moreover, potential product lists may be stored with respect to a number of different buyers.

The record includes entries identifying calculations associated with a potential product list. The record also defines fields 802, 804, 806, 808, 810 for each of the entries. The fields specify a product category identifier 802, a first potential product 804, a subsidy payment per product 806, a cost per product 808, and a break-even price per product 810. In particular, the record shown in FIG. 8 is associated with a first potential product list generated based on the shopping list illustrated in FIG. 7. The information in the product list calculation database 800 may be created, for example, in response to a shopping list received from a buyer.

The product category identifier 802 may be, for example, an alphanumeric code associated with each product category indicated in a buyer's shopping list. That is, the five entries illustrated in FIG. 8 are associated with five product categories that comprise a buyer's shopping list. The product category identifier 802 may be based on, or associated with, the product category identifier 302 stored in the product category database and/or the shopping list 716 stored in the shopping list database 700.

For each product category in a shopping list, the product list calculation database 800 also stores a first potential product 804 that may be selected for a buyer. The first potential product 804 may include, for example, the product identifier 402, the product description 404, and the product brand 406 based on information stored in the product database 400. The first potential product 804 may be selected, for example, based on the products in the category 306 stored in association with the product category identifier 302 in the product category database 300.

The product list calculation database 800 also stores information associated with the first potential product 804. In particular, the product list calculation database 800 stores the subsidy payments per product 806 that may be applied to a transaction and the cost per product 808. Note that the subsidy payments per product 806 may be determined based on information stored in the subsidy database 500 (e.g., the first entry in the subsidy database 500 indicates that a subsidy amount 506 of $2.00 can be applied to a transaction when RAGU® pasta sauce is selected according to the subsidy rule 508).

The cost per product 808 may represent, for example, an amount the controller 200 must provide to a merchant in exchange for providing a product to a buyer. The cost per product 808 may be based on, for example, a retail price associated with a product.

The break-even price per product 810 represents the cost per product 808 less the subsidy payments per product 806. For example, as shown by the first entry in FIG. 8, the controller 200 must provide a payment of $3.50 to a merchant in exchange for providing RAGU® pasta sauce to a buyer (e.g., based on the cost per product 808). Moreover, the controller 200 can receive a $2.00 subsidy each time RAGU® pasta sauce is selected for a buyer (e.g., based on the subsidy payments per product 806). In this case, the controller 200 will break even (e.g., will not make a profit nor suffer a loss) if a buyer pays $1.50 for pasta sauce ($3.50−$2.00=$1.50).

The product list calculation database 800 stores the per product totals 818 indicating the subsidy payments 814 that will be received on a product-by-product basis for the entire first potential product list (e.g., the entire record). The product list calculation database 800 also stores other 820 subsidy payments 814 that may be applied to the transaction (e.g., subsidies that are provided for a number of transactions instead of on a product-by-product basis). The sum of the per product totals 818 and the other 820 subsidy payments 814 is stored as the total for the first potential product list 822.

The product list calculation database 800 stores the per product totals 818 indicating the costs 816 on a product-by-product basis for the entire first potential product list (e.g., the entire record). The product list calculation database 800 also stores other 820 costs 816 that may be applied to the transaction (e.g., costs incurred for a number of transactions instead of on a product-by-product basis). The sum of the per product totals 818 and the other 820 costs 816 is stored as the total for the first potential product list 822.

The total costs 816 less the total subsidy payments 814 is stored as the break-even price for the first potential product list 826. With respect to the record shown in FIG. 8, the buyer must offer to pay $6.50 in order for the controller 200 to break-even on the transaction. However, because the buyer actually offered to pay $9.00 (e.g., based on the offer price 714 stored in the shopping list database 700), the net profit or loss 828 for the transaction would be a $2.50 profit if the first potential product list shown in FIG. 8 is selected for the buyer.

Similar records may be stored, and similar calculation may be performed, for any number of potential product lists.

Product List Comparison Database

Referring to FIG. 9, a table represents one record of the product list comparison database 900 that may be stored at the controller 200 shown in FIG. 1B according to an embodiment of the present invention. The record includes entries that may be used to determine which potential product list should be selected in response to a buyer's shopping list. In particular, four potential product lists may be compared using the record shown in FIG. 9. Note that the record shown in FIG. 9 is associated with the shopping list illustrated in FIGS. 7 and 8.

The table defines fields 902, 904, 906, 908, 910 for each of the entries. The fields specify a shopping list 902, a first potential product list 904, a second potential product list 906, a third potential product list 908, and a fourth potential product list 910.

The shopping list 902 may include, for example, an alphanumeric code associated with each product category indicated in a buyer's shopping list. That is, the five codes illustrated in FIG. 9 are associated with five product categories that comprise a buyer's shopping list. The shopping list 902 may be based on, or associated with, the product category identifier 302 stored in the product category database and/or the shopping list 716 stored in the shopping list database 700.

For the product categories in the shopping list, the product list comparison database 900 stores potential product lists that may be selected by the controller. For example, the first potential product list 904 shown in FIG. 9 is associated with the record of the product list calculation database 800 shown in FIG. 8. That is, the first potential product list 904 may be based on, or associated with, the first potential products 804 in that record. Similarly, the total subsidy payments 914, the total costs 916, the break-even price 918, and the net profit or loss 920 are based on information stored in the product list calculation database 800 as described in detail with respect to FIG. 8.

Based on the information in the product list comparison database 900, the controller 200 may select one of the potential product lists to be indicated to the buyer. As shown by the record in FIG. 9, the controller 200 may, for example, select the first potential product list 904, which is associated with the highest net profit or loss 920 (i.e., $2.50), to be indicated to the buyer.

Methods that may be used in connection with the transaction system 100 according to an embodiment of the present invention will now be described in detail with respect to FIGS. 10A through 10C.

Transaction System Methods

Figure 10A:
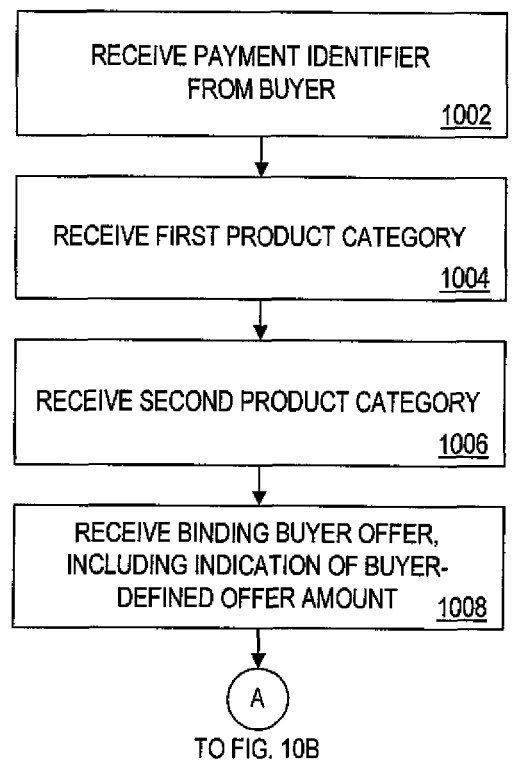
FIGS. 10A through 10C are a flow chart of a transaction method according to another embodiment of the present invention.
Figure 10B:
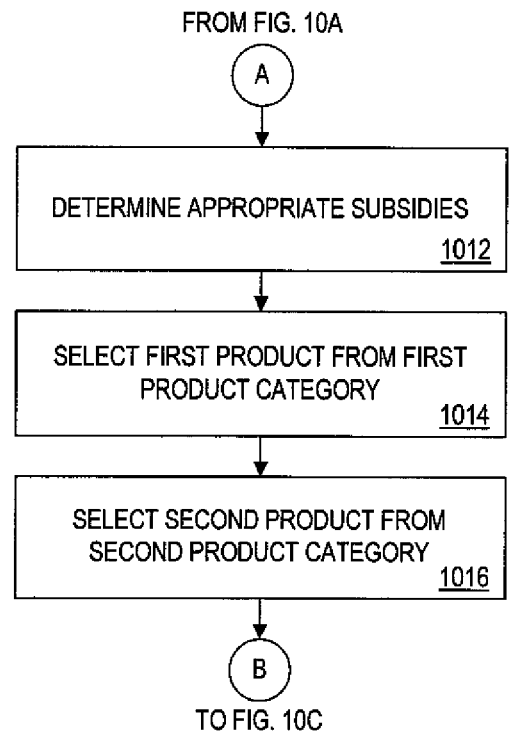
Figure 10C:
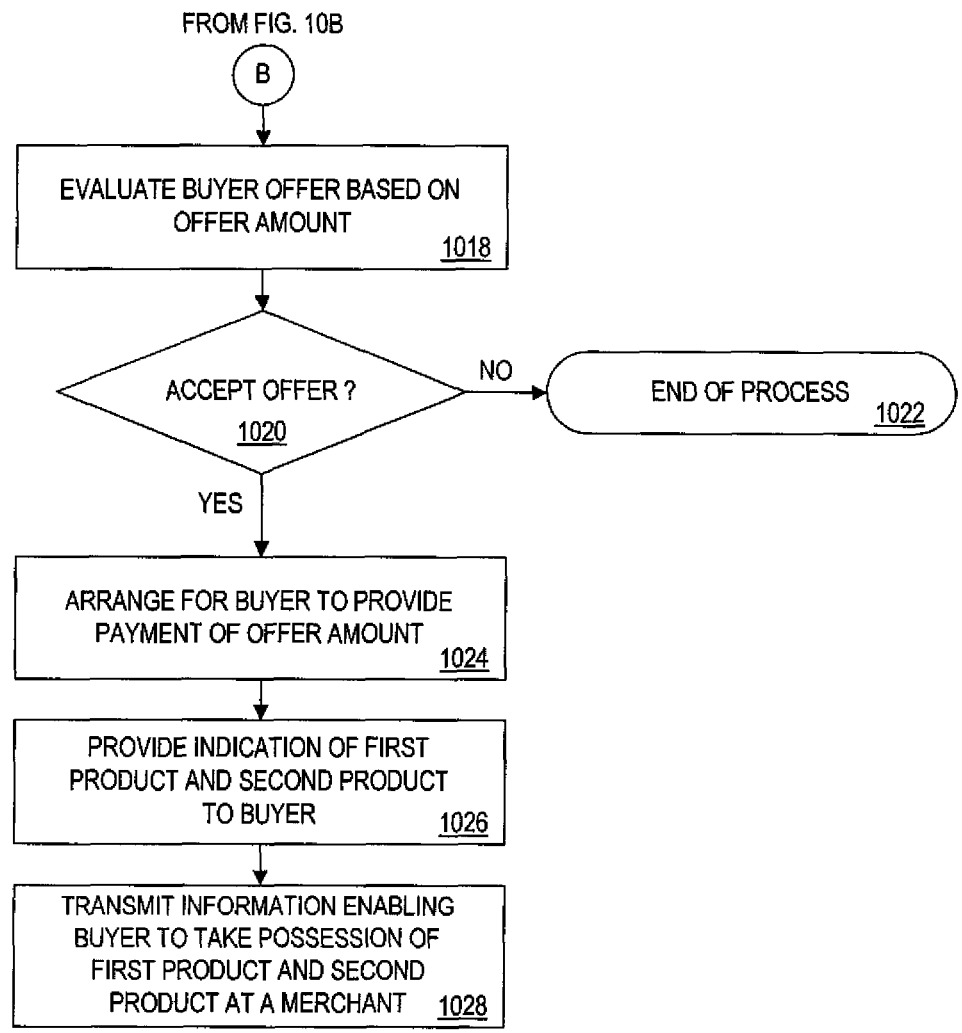

FIGS. 10A through 10C are a flow chart of a transaction method according to an embodiment of the present invention. The method shown in FIGS. 10A through 10C may be performed, for example, by a controller 200 in response to offer information received from a buyer device 20. This flow chart, as well as the other flow charts discussed herein, does not imply a fixed order to the steps, and embodiments of the present invention may be practiced in other orders.

Referring now to FIG. 10A, a payment identifier is received from the buyer at 1002. For example, the controller 200 may receive a credit card number from a buyer when he or she registers to use the transaction system 100.

At 1004, an indication of a first product category associated with a first set of products is received from the buyer. At 1006, an indication of a second product category associated with a second set of products is received from the buyer. According to one embodiment, the buyer may select the first and second product categories from a displayed list of available product categories. According to another embodiment, the buyer may instead select a plurality of acceptable product brands to create a product category. According to another embodiment, a buyer may also indicate that he or she prefers a particular product brand (e.g., but would also be willing to accept other product brands).

According to one embodiment, the buyer instead selects a predetermined shopping list from a displayed list of available shopping lists (e.g., by selecting a "two-person family shopping list").

According to still another embodiment, the buyer indicates a shopping list while he or she shops in a retail store. For example, a buyer may scan three different brands of breakfast cereal using a bar code scanner attached to his or her shopping cart. These three brands of cereal may then comprise a product category in which the buyer may offer to purchase a product. The buyer may repeat this process to create and/or modify a shopping list.

At 1008, a binding buyer offer is received from the buyer, including an indication of an offer amount associated with the first set of products and the second set of products. For example, the buyer may submit a single offer amount associated with both sets of products. According to another embodiment, the buyer may instead submit two offer amounts (e.g., one offer amount for each set of products).

According to one embodiment, the buyer defines the offer amount (e.g., by entering the offer amount via his or her PC). According to another embodiment, the buyer selects the offer amount from a list of appropriate offer amounts (e.g., "offer $10.00 for an 80% chance of acceptance" or "offer $5.00 for a 20% chance of acceptance"). According to another embodiment, the transaction system may determine an offer price, which can then be accepted or declined by the buyer.

Referring now to FIG. 10B, appropriate subsidies are determined at 1012. The appropriate subsidies may be determined, for example, based on information stored in the subsidy database 500 and/or information received from a subsidy provider device 40.

A subsidy may be provided, for example, by a manufacturer of a product (e.g., HUGGIES® may provide a subsidy of $2.00 for each box of RUGGLES® brand diapers that a buyer purchases), the controller 200 (e.g., a party associated with the controller 200 may contribute money from a marketing budget to gain buyers and market share), and/or a retail store (e.g., a retail store may provide a subsidy to encourage buyers to purchase products at a particular location).

A subsidy may comprise, for example, payment of a subsidy amount, including payment of money, products, services, or other consideration. The payment may be provided to various parties, including the controller 200 (e.g., a subsidy provider may provide $10,000 to the controller 200 so that the controller 200 will select a product for 80% of all buyers who purchase items in a particular product category), a buyer (e.g., a retail store may provide free home delivery to a buyer if he or she purchases more than $50 worth of products through the controller 200).

A subsidy may also be associated with a subsidy rule, such as a rule that describes when the subsidy should be provided. For example, a subsidy rule may indicate that a subsidy payment should be provided whenever a particular product is selected from a product category (e.g., a buyer indicates that he is willing to purchase any pasta sauce and RAGU® is selected), a number of different products are selected for the buyer (e.g., a buyer indicates that he or she would like to purchase any brand of tortilla chips and any brand of salsa and TOSTITOS® chips and salsa are selected), a buyer purchases a product (e.g., a buyer purchases CAMPBELL'S® soup when the controller 200 selects "either CAMPBELL'S® or PROGRESSO®" to be purchased by the buyer), a buyer indicates a particular product or product category in a shopping list (e.g., a buyer wants to buy either PAMPERS® or HUGGIES® brand diapers), a buyer's shopping list has certain properties, a product naturally achieves a particular market share within a product category (e.g., 80% of all hot dogs sold through the controller 200 are OSCAR MEYER® or 100% of all bars of soap sold through the controller are IVORY®), a buyer is told to purchase a product in a plurality of transactions (e.g., QUAKER® oatmeal has been selected for a buyer in six different transactions), and/or it is determined that a buyer has a preference for particular product (e.g., a buyer indicates in a survey that he or she prefers PEPSI® over COKE®).

Note that subsidy payments may be provided before or after a subsidy rule is satisfied. For example, a subsidy provider may pay $5,000 to the controller 200 to subsidize future transactions. Another subsidy provider may pay $5,234 to the controller 200 based on purchases that have already been made by buyers over the last month.

According to one embodiment, there may be restrictions as to which subsidies are acceptable. For example, the controller 200 may prohibit a first manufacturer from offering a subsidy of $10,000 for a market share of 30% for a first product if a second manufacturer has already offered a subsidy of $12,000 for a market share of 80% on a competing product. That is, it would be impossible to accept both subsidies because there is no way for the first product to have a market share of 30% if the competing product has a market share of 80% (i.e., 30%+80%=110%).

At 1014, a first product is selected for the first product category. At 1016, a second product is selected from the second product category. Note that these selections may be performed in any number of ways. For example, the selection of the second product may be completely independent from the selection of the first product. On the other hand, consider the case where three possible products may be selected for each product category. In this case, nine different potential product pairs may be selected for the buyer. The controller 200 may compare each of the nine potential product pairs to determine, for example, which pairs will result in the buyer's offer being accepted and/or which pairs will result in the largest profit.

Note that for a given shopping list, a large number of potential product lists may be possible. For example, if a buyer submits a shopping list that includes ten product categories, with three products in each product category, there may be 59,049 (i.e., $3^{10}$) different potential product lists. For shopping lists that include more product categories, or product categories that include more products, there are even more potential product lists.

Because so many potential product lists may be possible for a given shopping list, the controller 200 may use a pre-selection process to determine which potential product lists should be considered. Possible pre-selection processes include eliminating potential products from a product category and dividing a shopping list into smaller lists (e.g., and determining an optimal product list for each smaller list). The controller 200 may also, for example, consider only those products or product categories where at least one subsidy is applicable.

According to one embodiment, the controller 200 selects a product list by determining a net profit or loss 920 for each potential product list (i.e., the amount of money that will be made or lost by selling the potential product list for the offer price submitted by the buyer). For example, the controller 200 may consider a cost associated with each product in the potential product list (e.g., when the controller 200 purchases products from retail stores and sells the products to buyers), additional costs associated with the potential product list (e.g., transaction costs, overhead costs, and taxes), available subsidies for each product in the potential product list, subsidies that apply to multiple products in the potential product list, subsidies that apply to the entire product list, and/or subsidies that apply to the buyer.

Note that for particular types of subsidies (e.g., a market share subsidy), it may be helpful to calculate or estimate a subsidy payment per product. For example, Proctor & Gamble may offer a subsidy payment of $10,000 to obtain a market share of 70% for HEAD & SHOULDERS® shampoo for a duration of three months. In order to estimate a subsidy payment per product for HEAD & SHOULDERS® shampoo, the controller 200 may estimate the number of shampoo purchases that will be made during those three months. If, for example, the controller 200 estimates that 20,000 bottles of shampoo will be purchased during these three months, the 70% represents 14,000 bottles of HEAD & SHOULDERS® shampoo. In this case, the subsidy payment per product will be about $0.71 (i.e., $10,000 divided by 14,000). Similar calculations may be necessary for other types of subsidies.

One method of determining a net profit or loss 920 for several lists of potential products 904, 906, 908, 910 is described in detail with respect to FIGS. 8 and 9. These figures also describe how a break-even price 918 may be determined. Note that for products that do not have an associated subsidy, the break-even price per product 810 is equal to the cost per product 808. This means that if a buyer were to purchase each of these products individually, and the controller 200 was not willing to accept a negative net profit or loss 828 for any of the products, then the buyer would have to submit offer prices equal to the break-even price per product 810. That is, the buyer would only be able receive discounts on products for which subsidies were available, and the controller 200 would reject all of the buyer's offers to purchase non-subsidized products at lower prices. According to some embodiments of the present invention, however, subsidies may be applied to an entire product list, rather than the individual products in the product list. Moreover, an excess in the buyer's offer amount may be applied to other product categories.

Consider the four potential product lists 904, 906, 908, 910 shown in FIG. 9, each having a different set of products. For each potential product list, the product list comparison database 900 stores the total subsidy payments 914, the total costs 916, the break-even price 918, and the net profit or loss 920 that would result from selling the potential product list for the offer price. This information may then used to select one potential product list for the buyer.

Other information may also be used to select products, including historical information (e.g., HUGGIES® diapers may be selected for a buyer who has purchased HUGGIES® diapers in the past), random factors (e.g., when two potential product lists have the same net profit or loss 920), preferences for particular products (e.g., the controller 200 may be aware that most buyers prefer a particular product), and/or preferences for particular subsidies (e.g., the controller 200 may take advantage of a subsidy that will not be available in the near future).

Referring now to FIG. 10C, the buyer's offer is evaluated based on the offer amount at 1018. The evaluation may also be based on, for example, a transaction history associated with a buyer, an address associated with the buyer, demographic information associated with the buyer, psychographic information associated with the buyer, a credit rating associated with the buyer, another offer associated with the buyer, and/or an indication of a plurality of merchants associated with the buyer.

According to one embodiment, the evaluation comprises determining whether or not the buyer's offer will be accepted. According to another embodiment, the evaluation comprises calculating a probability that the buyer's offer will be accepted. For example, the controller 200 may calculate that a buyer's offer has an 80% chance of being accepted. The controller 200 may then use a random process to determine if the offer will actually be accepted.

According to one embodiment, the controller 200 evaluates the buyer's offer by comparing the offer amount with minimum acceptable prices associated with the selected products. A minimum acceptable price may be based on, for example, a wholesale or retail price associated with a product (e.g., adjusted by a predetermined amount or a predetermined percentage). For example, the controller 200 may accept a buyers offer only when the offer amount is more than 90% of the sum of the retail prices associated with the selected products.

According to another embodiment, the controller 200 evaluates the buyer's offer based on a subsidy. For example, the controller 200 may determine a subsidy based on the plurality of product categories in the buyer's shopping list. The controller 200 may also select a subsidy from a plurality of potential subsidies (e.g., by selecting the subsidy that results in an acceptance of the buyer's offer).

The subsidy may also be based on, for example, information associated with a buyer (e.g., a history the buyer has with the transaction system 100). According to other embodiments, the subsidy may be based on, for example, a product identifier, a product category, a product manufacturer, a product brand, a product description, a product quantity, a product class, at least one product feature, an accessory associated with the product, an age associated with the product, a product condition, a product preference, an offer period, a product cost, a product retail price, the offer amount, delivery information, and/or payment information.

According to one embodiment, the controller 200 may use information from the product list comparison database 900 to determine the acceptability of a selected product list. For example, the controller 200 may store at least one value indicating a minimum acceptable profit for each product list. If the net profit or loss 920 for a product list is greater than the minimum acceptable profit, then the buyer's offer may be accepted. Similarly, the controller 200 may store a maximum acceptable loss for product lists to determine the acceptability of a product list based on the net profit or loss 920.

The controller 200 may determine that none of the potential product lists are acceptable based on the buyer's offer price. For example, a buyer may submit an offer price of $2 for a shopping list that includes many expensive products or product categories. If it is determined that the buyer's offer will not be accepted at 1020, the process ends at 1022. According to another embodiment, the controller 200 may instead transmit to the buyer a suggested modification to the buyer's offer. For example, the controller 200 may suggest that the buyer agree to a modified offer amount, a modified shopping list, and/or a modified list of acceptable products within a product category. According to another embodiment, the buyer may adjust the buyer's offer (e.g., based on a suggestion from the controller 200 or his or her own needs).

According to another embodiment, if it is determined that the buyer's offer will not be accepted at 1020, a penalty is applied to the buyer. That may be done, for example, to prevent a buyer from submitting a number of offers, each being associated with a slightly higher offer amount, in an attempt to determine the lowest possible offer amount that will be accepted by the transaction system 100. For example, the penalty may comprise arranging for a buyer to provide payment of a penalty amount (e.g., using his or her payment identifier), and/or preventing at least one subsequent offer from the buyer (e.g., for one week). According to another embodiment, a fee may be charged to the buyer whenever he or she submits an offer (i.e., regardless of whether or not the offer is accepted). According to another embodiment, a buyer may pay a fee each month in exchange for using the transaction system 100 (e.g., by submitting a limited number of offers each month).

If it is determined that the buyer's offer will be accepted at 1020, it is arranged for the buyer to provide payment of an amount based on the offer amount using his or her payment identifier at 1024. For example, buyer may provide payment to the controller 200 in exchange for the selected products. In this case, the controller 200 may in turn provide a payment (e.g., of a lesser amount, of the same amount, or of a greater amount) to a merchant who provides the selected products to the buyer. According to another embodiment, the controller 200 instead arranges for the buyer to provide payment directly to the merchant. In this case, the controller may charge a fee to the buyer and/or the merchant (e.g., a predetermined fee or a fee based on a retail price, an offer amount, or a number of products involved in a transaction) in exchange for facilitating the transaction.

At 1026, an indication of the first product and the second product is provided to the buyer. For example, the controller 200 may send an electronic mail message to the buyer indicating which products have been selected. According to another embodiment, the controller 200 may simply arrange for the selected products to be delivered to the buyer (e.g., the products themselves indicating their selection).

At 1028, information is transmitted enabling the buyer to take possession of the first product and the second product at a merchant. For example, the controller 200 may transmit a transaction code to the buyer. The transaction code may be, for example, a verifiable "hash" value generated when transaction information is used with a hash function, such as a one-way hash function. A hash function is a transformation that takes input information and returns a hash value. In general, one can think of a hash value as a "digital fingerprint" of the input information. For example, the input information to the hash function may be the buyer's name and address and information about the selected products (e.g., a list of selected product identifiers 402). In this case, the hash function would generate the transaction code based on the input information. A merchant device 30 could then validate the transaction code using another function. Applicable hash functions and other encryption techniques are described in Bruce Schneier, "Applied Cryptography: Protocols, Algorithms, and Source Code in C" (John Wiley & Sons, Inc., 2nd Ed. 1996).

According to another embodiment, the controller 200 transmits information to a payment processing device 50 to enable the buyer to take possession of the selected products from a merchant. For example, each buyer may be given a pseudo-debit card (e.g., a magnetic stripe card having a sixteen digit number). The buyer may then request the products by swiping the pseudo-debit card number at a merchant's CAT device. The sixteen digit number associated with the pseudo-credit card number may cause the request to be routed to a payment processing device 50 associated with the controller 200. In this way, the controller 200 can arrange for an authorization to be provided in response to the request (e.g., by establishing a pseudo-debit card account having sufficient funds with the payment processing device 50).

According to another embodiment, the controller 200 instead arranges for the selected products to be delivered to a buyer (e.g., via a delivery service such as FEDERAL EXPRESS®).

Thus, embodiments of the present invention enable a buyer to provide a shopping list to a transaction system 100, without indicating the exact brands of products that will be purchased. The transaction system 100 may then select products for the buyer based on his or her shopping list.

Additional Embodiments

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

In addition to suggesting a modified offer when a buyer's offer amount is too low, the controller 200 may suggest a modified offer when a buyer's offer amount is too high. For example, if a buyer indicates a shopping list and offers to provide payment of an amount that significantly more than the break-even price 918 associated with even the most expensive potential product list 904, 906, 908, 910 (e.g., by a predetermined amount or percentage), the controller 200 may suggested that the buyer reduce the offer amount and/or add additional product categories to his or her shopping list.

According to another embodiment, the controller 200 may also suggest that the buyer accept one or more third party subsidy offers when his or her offer is rejected. For example, the controller 200 may indicate that the buyer's offer would be accepted if he agrees to test drive a new automobile. Other examples of third party subsidy offers are disclosed in U.S. patent application Ser. No. 09/282,747 entitled "Method and Apparatus for Providing Cross-Benefits Based on a Customer Activity."

According to another embodiment, the controller 200 may suggest modifications to a list of acceptable product brands indicated by a buyer. For example, a buyer who indicates he or she would agree to purchase SPRITE® or SLICE® may be asked if 7 UP® would also be an acceptable product. Similarly, the controller 200 may suggest that a buyer add additional product categories to his or her shopping list. For example, a buyer who requests to purchase "hot dogs," "hot dog buns," and "hamburgers" may be asked if "hamburger buns" should be added to the shopping list.

According to still another embodiment, a product may actually comprise a plurality of products. For example, a product called "snack package number one" may comprise a bag of LAYS® potato chips, a six-pack of COKE®, and a box of OREO® cookies. According to yet another embodiment, a product may comprise a plurality of product categories. For example, a product called "snack package number two" may comprise a bag of potato chips, a six-pack of cola, and a box of cookies (i.e., without specifying one or more brands).

According to still another embodiment, the controller 200 may indicate to a buyer that he or she may purchase any product in a product category. The controller 200 may, for example, subsequently determine which product the buyer actually purchased in order to assess the popularity of various products.

According to another embodiment, the controller 200 may accept a buyer's offer with respect to some product categories and reject the buyer's offer with respect to other product categories. In this case, the controller 200 may only select and indicate products for the accepted product categories. For example, a buyer may offer to pay $10.00 for one lunch entrée and one desert item from any of a number of local restaurants. In this case, the controller 200 may indicate that although all of the products requested by the buyer (i.e., the lunch entrée and the desert item) cannot be provided in exchange for $10.00, the buyer may purchase an all-you can eat shrimp lunch entrée at a RED LOBSTER® restaurant. According to one embodiment, the buyer may be obligated to accept this selection. According to another embodiment, the buyer is allowed to decline the selection. Note that the controller 300 may also accept a buyer's offer with respect to a subset of product categories when the buyer provides offer prices associated with each of the product categories (e.g., $8.00 for a lunch entrée and $2.00 for a desert item).

According to another embodiment, the controller 200 may provide several potential product lists to a buyer. The customer may then be allowed to select one of the potential product lists.

Moreover, although embodiments of the present invention have been described such that the controller 200, the merchant device 30, and the subsidy provider device 40 are associated with separate parties, note that according to other embodiments, the controller 200 may be associated with the merchant and/or the subsidy provider.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
  receiving, by one or more computing systems from a client system of a buyer, a selection of a first product of a plurality of products associated with a merchant;
  receiving, from the client system, an indication of a definition of the plurality of products;
  generating, by the one or more computing systems, a product category associated with the plurality of products based on the definition of the plurality of products;
  providing, by the one or more computing systems, a listing of the plurality of products for display on the client system;

determining, by the one or more computing systems, an offer price associated with the product category;

selecting, by the one or more computing systems, based on the offer price, a second product from the plurality of products;

receiving, by the one or more computing systems, from a computing device associated with the merchant, a transaction code associated with the second product; and providing, by the one or more computing systems, an indication of the selected second product and the transaction code to the client system.

2. The method of claim 1, further comprising determining, for each product associated with the product category, one or more subsidies applicable to the product.

3. The method of claim 1, further comprising:
transmitting, by the one or more computing systems to the client system, instructions to display a listing of at least two pluralities of products based on the selected first product;
receiving, from the client system of the buyer, a selection of one of the at least two pluralities of products; and
defining, by the one or more computer systems, the product category based on the selection.

4. The method of claim 1, wherein the computing device is associated with the one or more computing systems.

5. The method of claim 1, further comprising transmitting, by the one or more computing systems to the processing device, information enabling the buyer to take possession of the first product at the merchant.

6. The method of claim 2, wherein each of the one or more subsidies reduces the offer price by a subsidy amount according to a subsidy rule.

7. A system comprising:
one or more processors; and
a memory coupled to the processors and comprising instructions executable by the processors, the processors being operable when executing the instructions to:
receive, from a client system of a buyer, a selection of a first product of a plurality of products associated with a merchant;
receive, from the client system, an indication of a definition of the plurality of products;
generate a product category associated with the plurality of products based on the definition of the plurality of products;
provide a listing of the plurality of products for display on the client system;
determine an offer price associated with the product category;
select, based on the offer price, a second product from the plurality of products;
receive, from a computing device associated with the merchant, a transaction code associated with the second product; and
provide an indication of the selected second product and the transaction code to the client system.

8. The system of claim 7, wherein the processors are further operable to determine, for each product associated with the product category, one or more subsidies applicable to the product.

9. The system of claim 7, wherein the instructions further comprise instructions to:
transmit to the client system instructions to display a listing of at least two pluralities of products based on the selected first product;
receive, from the client system, a selection of one of at least two pluralities of products; and
define the product category based on the selection.

10. The system of claim 7, wherein the processing device is associated with the one or more computing systems.

11. The system of claim 7, further comprising transmitting, by the one or more computing systems to the processing device, information enabling the buyer to take possession of the first product at the merchant.

12. The system of claim 8, wherein each of the one or more subsidies reduces the offer price by a subsidy amount according to a subsidy rule.

13. One or more computer-readable non-transitory storage media embodying software that is operable when executed to:
receive, from a client system of a buyer, a selection of a first product of a plurality of products associated with a merchant;
receive, from the client system, an indication of a definition of the plurality of products;
generate a product category comprising a plurality of products which includes the first product based on the definition of the plurality of products;
provide a listing of the plurality of products for display on the client system;
determine an offer price associated with the product category;
select, based on the offer price, a second product from the plurality of products;
receive, from a computing device associated with the merchant, a transaction code associated with the second product; and
provide an indication of the selected second product and the transaction code to the client system.

14. The media of claim 13, wherein the software is further operable to determine, for each product associated with the product category, one or more subsidies applicable to the product.

15. The media of claim 13, wherein the software is further operable when executed to:
receive, from the client system, an indication of a definition of the plurality of products; and
generate the product category based on the definition.

16. The media of claim 13, wherein the software is further operable when executed to:
transmit to the client system instructions to display a listing of at least two pluralities of products based on the selected first product;
receive, from the client system, a selection of one or the at least two pluralities of products; and
define the product category based on the selection.

17. The media of claim 13, wherein the processing device is associated with the one or more computing systems.

18. The media of claim 14, wherein each of the one or more subsidies reduces the offer price by a subsidy amount according to a subsidy rule.

* * * * *